United States Patent [19]

Binard

[11] 3,941,703

[45] Mar. 2, 1976

[54] WIRE SCREENS

[75] Inventor: Edouard Binard, Brussel, Belgium

[73] Assignee: N. V. Bekaert S.A., Zwevgem, Belgium

[22] Filed: Dec. 2, 1974

[21] Appl. No.: 528,639

[30] Foreign Application Priority Data

Dec. 12, 1973 United Kingdom ............... 57430/73

[52] U.S. Cl. ............. 210/499; 29/163.5 F; 140/107

[51] Int. Cl.[2] ........................................ B01D 39/10

[58] Field of Search ........ 140/107; 29/163.5; 245/8; 210/496, 497.1, 499

[56] References Cited

UNITED STATES PATENTS 3,049,796 8/1962 Pall .................................. 29/163.5

3,123,446 3/1964 Wheeler, Jr. ...................... 29/163.5

3,525,139 8/1970 Fournier ......................... 210/497.1

3,667,615 6/1972 Likness ........................... 210/497.1

*Primary Examiner*—Lowell A. Larson

*Attorney, Agent, or Firm*—Shlesinger, Arkwright, Garvey & Dinsmore

[57] ABSTRACT

A process for producing metal wire screens having extremely narrow slot widths. The process comprises compressing along the longitudinal axes of the supporting wires a wire screen having parallel narrowly spaced screening wires supported by parallel supporting wires and wherein the average spacing of the screening wires is larger than desired. The compression effects plastic deformation of the supporting wires whereby the desired average slot width is formed.

28 Claims, 4 Drawing Figures

WIRE SCREENS

The invention relates to the manufacture of metal wire screens having very narrow slot widths, more particularly slot widths smaller than 25 μm.

Conventional wire screens basically comprise a first set of substantially parallel wires, or alternatively one or more wires curved (e.g. by spiralling), whereby portions of the wire are parallel to other portions of the wire, so-called screening wires, which constitute the sieve surface and between which there are narrow slot widths, and a second set of wires, so-called supporting wires, which serve to support the screening wires. Such wire screens are hereinafter described as "wire screens of the type referred to". In general, the supporting wires are conveniently parallel and are fixed to the screening wires in positions substantially transverse thereto.

Wire screens of the type referred to have generally been produced by welding. In practice, the minimum wire screen slot width which can generally be achieved by means of welding is approximately 25 μm and the straightness tolerance for screening wires is approximately 10 μm. A further deviation of the same order must be taken into account in regard to the welding operation carried out in the manufacture of the screens. Specifically, allowance must be made for the transverse thermal expansion of the screening wires in the area of the weld during the resistance welding operation and individual screening wires must be prevented from touching adjacent welded wires as a result of such transverse expansion. Otherwise, a current leakage would arise via the adjacent screening wire and the quality of the new welding spot would thereby be greatly diminished. Thus, it has in the past generally been necessary to ensure a minimum slot width of approximately 25 μm during welding.

For certain applications, however, there is a need to separate solid, viscous or liquid particles of cross-sections smaller than 25 μm from liquids or gases by means of wire screens. It is therefore an object of the present invention to provide a process for producing wire screens with slot widths smaller than 25 μm suitable for such applications.

According to the present invention we provide a process for producing wire screens of the type referred to having a desired average slot width less than 25 μm which comprises compressing along the longitudinal axes of the supporting wires a wire screen of the type referred to having a larger than desired slot width whereby plastic deformation of the supporting wires is effected and a wire screen having the desired average slot width is thereby formed. It is in general convenient to apply the process according to the invention to screens which prior to compression have an average slot width of at least 25 μm.

In order to ensure an efficient compression operation in the production of the wire screens, it is desirable that the supporting wires be capable of being plastically deformed under the application of a low axial compressive force. The need to apply high compressive force can thus give rise to problems, particularly when a slot width of not more than 10 μm is desired, due to the transmission of such forces directly to the mutually juxtaposed contacting surfaces of the screening wires. With certain screening wires, this can result in deformation and even damage of the contacting surfaces and consequently in undesired slot width irregularities. In practice, this means, on the one hand, that the supporting wire material should preferably not be too hard, and on the other hand that the ratio of the cross-sectional area of the supporting wire (even for supporting wires of relatively ductile material) to the cross-sectional area of the screening wire should preferably be less than 4:1. It is also advantageous for the quality of fixing the welds if the above-mentioned ratio-limit is respected.

On the other hand, the axial compressive force on the supporting wires should result in permanent plastic deformation thereof. Since only very slight deformations are generally involved, e.g. of the order of about 1% to 4% in length, the supporting wires should be made of a ductile material since a slight compression of hard metal supporting wires would tend to be elastic and would consequently cause no permanent deformation. Furthermore, it may be advantageous to effect the compression treatment while the screen is at an elevated temperature.

Using the process of the invention, it has been found possible to effect a substantially constant reduction in slot width in wire screens of the type referred to.

In wire screens to which the present invention is applied, the distance between adjacent supporting wires is preferably at least 5 times but not more than 25 times the width of the screening surface of individual screening wires. The screening wires preferably have an essentially triangular cross-section and in the form of an isosceles triangle or in a form approximating same and, if desired, may have rounded corners. For convenience of manufacture, it is particularly preferred that the supporting wires have a cross-section and shape similar to that of the screening wires, the cross-sectional areas of the screening and supporting wires preferably being approximately equal.

The wire screens produced in accordance with the present invention are illustrated in the accompanying drawings in which.

Figure 1:
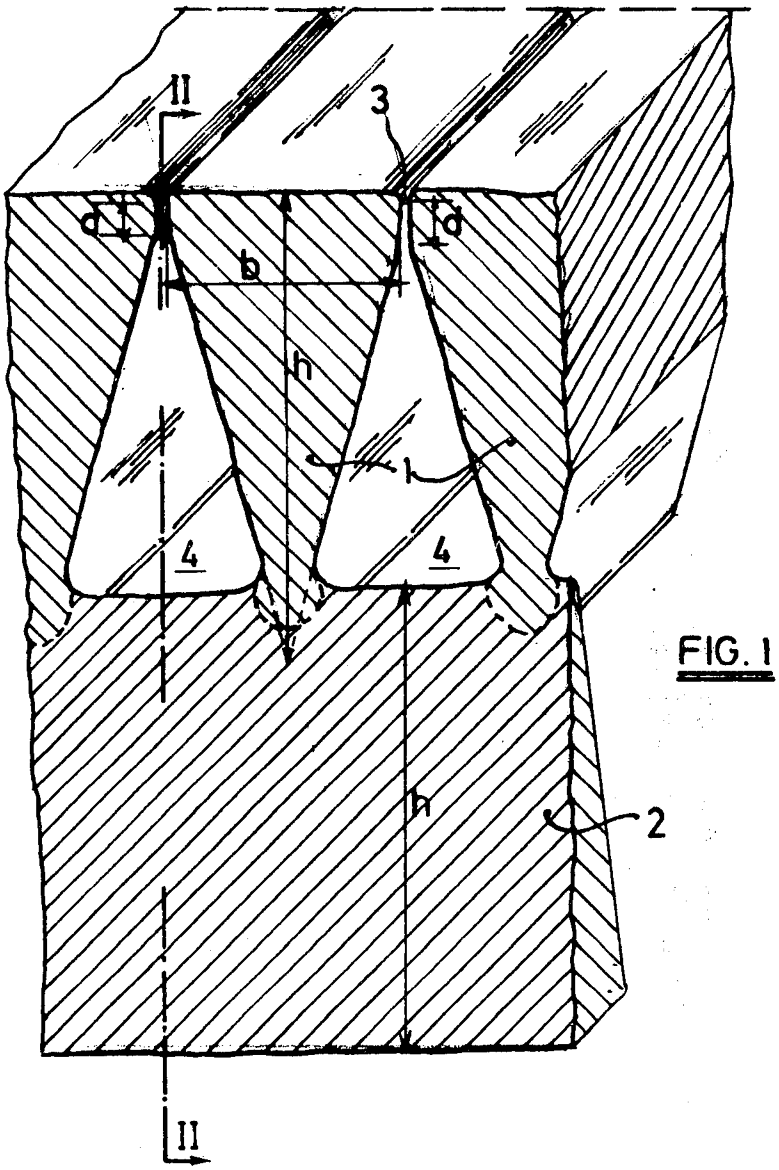
FIG. 1 is an enlarged cross-section taken along the center line of a supporting wire in a screen made in accordance with the present invention.
Figure 2:
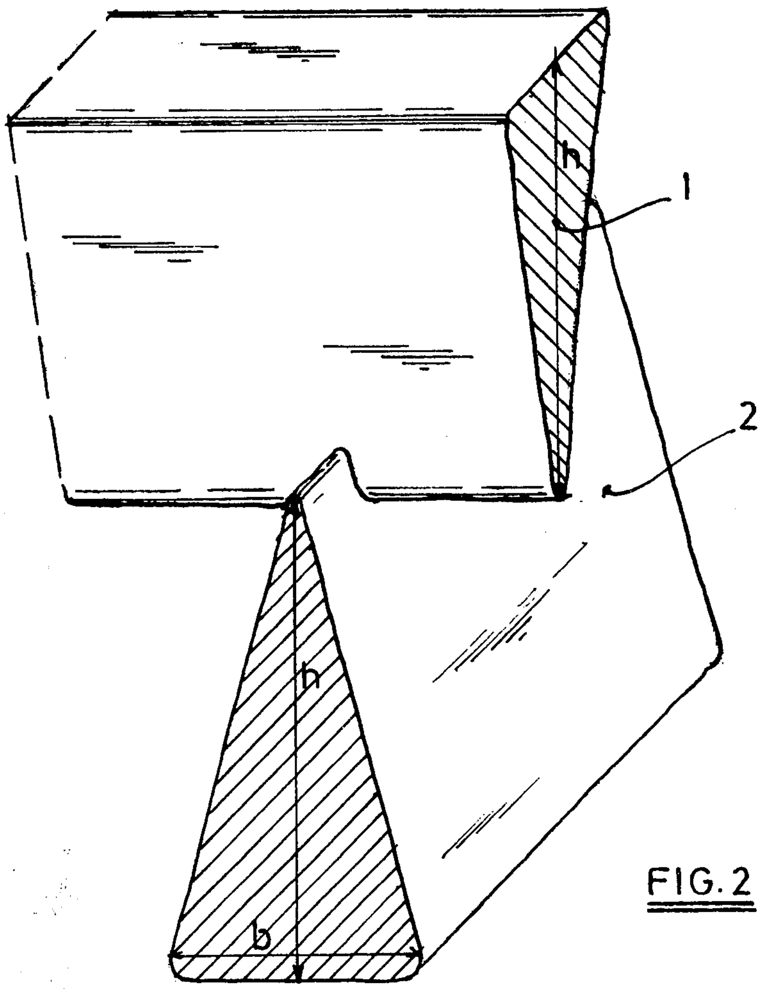
FIG. 2 is a sectional view of FIG. 1 taken along line II—II and viewed in the direction of the arrows.

As shown in FIGS. 1 and 2 of the drawings, the touch welding points of both wire sets 1 and 2 are situated at a corner edge. Base *b* of the screening wire 1 and the supporting wire 2 is approximately half the height *h* thereof and lies opposite the corner adjacent the two equal sides of the triangle. The *b*/*h* ratio will preferably be between 0.3 and 0.9 so that an optimum depth d of the screen slot 3 and an optimum welding seam and compressibility can be obtained. If the *b*/*h* ratio is smaller than 0.3, the welding seam can fill the free space 4 between the contact areas of the screening and supporting wires to an undesirable extent, which may impede successive compression operations. Another detrimental consequence of too small a *b*/*h* ratio is the increase of slot depth *d*, which increases the risk of choking slot 3. If the *b*/*h* ratio is higher than 0.9, there is a risk that the slot width will be more irregular, for example due to the decrease in $d$. In addition, in case of too high a $b/h$ ratio the edges adjacent to the slot would become too sharp and too vulnerable. The wear of the slot edges during operation would therefore rapidly increase the slot width to an undesirable extent, such as increase being much more rapid than with the preferred embodiment according to FIGS. 1 and 2. Preferred values for $b$ vary between 2 mm and 500 $\mu$m.

When an average slot width of 15 $\mu$m is desired and allowance is made for the wire straightness tolerance, it may be assumed that the actual slot width will vary between 10 $\mu$m and 20 $\mu$m. Correspondingly, an average slot width of 10 $\mu$m will correspond to an actual slot width varying from 5 $\mu$m to 15 $\mu$m while for an average slot width of 5 $\mu$m, the actual slot width will in fact be smaller than 10 $\mu$m, e.g. varying between 1 and 10 $\mu$m. When the wire screen width, i.e. the length of the supporting wires to be compressed, is considerable, it is generally desirable to support the wire screen in an independent framework of wear-resistant supporting members in order to avoid the formation of kinks in the wires, especially in the supporting wires.

The screening and supporting wires can, if desired, be made of the same material. Ductile properties may be imparted at least to the supporting wires by, for example, a suitable heat treatment for the purpose of facilitating the compression operation. If only the supporting wires are made of a ductile material, it will be appreciated that the ductility-imparting (heat) treatment should take place prior to their welding to the screening wires. It is generally more advantageous to make only the supporting wires, and not both the screening and supporting wires, out of a ductile material since harder screening wires possess better wear resistance and a higher mechanical strength than ductile screening wires. Since good resistance to both wear and corrosion is often required for wire screens, a combination of ordinary stainless steel screening wires with annealed stainless steel supporting wires is one preferred combination for the wire screens of the present invention.

Provided that the weldability is not unduly affected, different metals may be used for the supporting and screening wires respectively, providing that at least the supporting wires are ductile or can be rendered so. In addition to steel, Titan, Monel, Hastelloy and various other alloys can also be used in the production of wire screens according to the present invention. For example, both the screening and supporting wires can be made of Titan or Monel, or the screening wires of Hastelloy and the supporting wires of annealed Hastelloy. It may also be desirable to support the compressed wire screen produced according to the invention on one or more independent grid-like frames of more highly resistant wires if it is envisaged that the wire screen will be subjected during use to considerable variations in pressure perpendicular to the screening area.

The screening area of the wire screens according to the invention can be, for example, a surface of revolution such as a cylinder, although a flat surface can be used, particularly for low pressure filtration or small filtering surfaces. It is generally preferred that the supporting wire direction coincide with that of the generating line of the surface of revolution. Curved screens of various shapes can be obtained by suitably bending flat screens and another form of curved screen can be obtained by bending a cylindrical screen about its axis.

Figure 3:
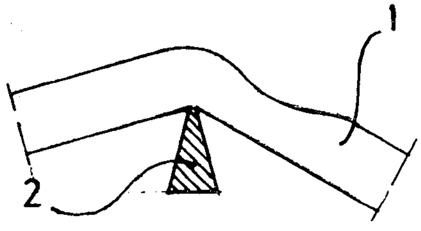
FIG. 3 is a cross-sectional view of a small portion of a screen, taken through one supporting wire and showing undesired narrowing of screening wires due to bending.
Figure 4:
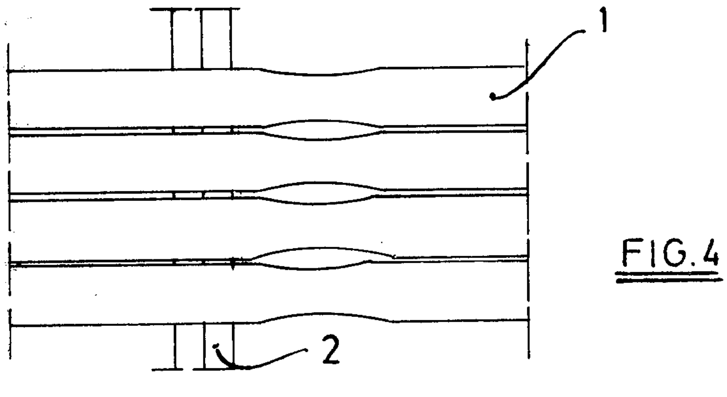
FIG. 4 is a plan view of a small portion of a screen again having undesired narrowing of screening wires due to bending.

Sharp bending of the screening wires adjacent a supporting wire, however, should generally be avoided as this produces in the area of the bend a very pronounced narrowing of the screen wires and consequently an undesirable increase in the slot width in the vicinity of the supporting wire as shown in FIGS. 3 and 4.

For high pressure filtration, flat screen surfaces are not generally preferred since not only the supporting wires but also the screening wires would need to be too thick in order to resist bending under the pressure. Cylindrical screens are thus preferably used for this purpose since the screening wires in the form of a continuous spiral are able to resist more effectively the effects of the pressure gradient across the peripheral surface of the cylinder. Thus, the principal function of the supporting wires is to link the successive convolutions of the spiralled screening wire.

In order to form such cylindrical wire screens by the process according to the invention, one preferably employs a cylindrical wire screen formed from a spiral of hard screening wire, successive turns of the spiral being spaced apart to provide an average slot width of approximately 25 $\mu$m, and a plurality of ductile supporting wires disposed parallel to the longitudinal axis of the spiral of screening wire and welded to the screening wire. This wire screen is then compressed along the longitudinal axes of the supporting wires to effect a reduction of the average slot width to less than 25 $\mu$m.

For filtering large volumes of material, it is desirable to have the total area of filtering slots per unit area of filter screen surface as large as possible. The base b of the screening wires should thus be as small as possible, e.g. 0.5 mm, to provide more slots per unit area of filter screen surface. However, this generally necessitates the use of supporting wires with a similarly small base $b$, for the reasons stated above. In this way, the overall resistance of the screen to high pressure gradients or pressure pulses can be greatly reduced. However, since filtration output not only increases with the percentage of slot area but also with increasing pressure gradient across the screen surface, it may be advantageous to reinforce or support the screens made from thin wires, especially the cylindrical filter screens for high pressure filtration, with a grid-like rigid framework, to avoid any distortion, distention or collapse of the screen, the slots and/or the end caps or portions thereof.

What we claim is:

1. A wire screen having substantially parallel screening wires separated by slots of a desired average slot width less than 25 microns, said screen produced by compressing, along the longitudinal axes of the supporting wires, a wire screen comprising substantially parallel screen wires supported by supporting wires and wherein the screening wires are separated by slots having an average slot width greater than desired, the compression effecting plastic deformation of the supporting wires to narrow the slot width of the screening wires to thereby form the said wire screen having the desired average slot width.

2. A process for producing wire screens having substantially parallel screening wires separated by slots of a desired average slot width less than 25 microns, the process comprising compressing, along the longitudinal axes of the supporting wires, a wire screen comprising substantially parallel screening wires supported by supporting wires and wherein the screening wires are separated by slots having an average slot width greater than desired, the compression effecting plastic deformation of the supporting wires to narrow the slot width of the screening wires to thereby form a wire screen having the desired average slot width.

3. A process for producing wire screens of the type referred to having a desired average slot width which is less than 25 μm which comprises compressing along the longitudinal axes of the supporting wires a wire screen of the type referred to having a larger than desired average slot width whereby plastic deformation of the supporting wires is effected and a wire screen having the desired average slot width is thereby formed.

4. A process as claimed in claim 3 wherein the screen prior to compression has an average slot width of at least 25 μm.

5. A process as claimed in claim 3 wherein the screening wires and/or the supporting wires have an essentially triangular cross-section.

6. A process as claimed in claim 5 wherein the screening wires and/or the supporting wires have an essentially isosceles triangular cross-section.

7. A process as claimed in claim 6 wherein the ratio of the length of the unequal side of the said cross-section to the perpendicular distance from said unequal side to the apex formed by the two equal sides of the said cross-section is in the range of 0.3:1 to 0.9:1.

8. A process as claimed in claim 6 wherein the length of the unequal side of the said cross-section is 2mm to 500 μm.

9. A process as claimed in claim 5 wherein the said triangular cross-section has rounded apexes.

10. A process as claimed in claim 3 wherein the screening wires and the supporting wires have essentially the same cross-sectional shape.

11. A process as claimed in claim 3 wherein the ratio of the cross-sectional area of the supporting wires to the cross-sectional area of the screening wires is less than 4:1.

12. A process as claimed in claim 11 wherein the screening wires and the supporting wires have essentially the same cross-sectional area.

13. A process as claimed in claim 3 wherein the distance between adjacent supporting wires is from 5 to 25 times the width of the screening surface of individual screening wires.

14. A process as claimed in claim 3 wherein the wire screens formed have a slot width of from 10 μm to 20 μm.

15. A process as claimed in claim 14 wherein the wire screens formed have an average slot width of about 15 μm.

16. A process as claimed in claim 3 wherein the wire screens formed have a slot width of from 5 μm to 15 μm.

17. A process as claimed in claim 16 wherein the wire screens formed have an average slot width of about 10 μm.

18. A process as claimed in claim 3 wherein the wire screens formed have a slot width of from 1 μm to 10 μm.

19. A process as claimed in claim 18 wherein the wire screens formed have an average slot width of about 5 μm.

20. A process as claimed in claim 3 wherein the reduction in length effected by plastic deformation of the wire screen amounts to 1 to 4% measured along the longitudinal axes of the supporting wires.

21. A process as claimed in claim 3 wherein the supporting wires are composed of a material which is at least as ductile as the material of the screening wires.

22. A process as claimed in claim 3 wherein the supporting wires are composed of annealed stainless steel and the screening wires of stainless steel.

23. A process as claimed in claim 3 wherein the supporting wires and the screening wires are composed of Titan alloy.

24. A process as claimed in claim 3 wherein the supporting wires and the screening wires are composed of Monel alloy.

25. A process as claimed in claim 3 wherein the supporting wires are composed of annealed Hastelloy alloy and the screening wires of Hastelloy alloy.

26. A process as claimed in claim 3 wherein the wire screen is supported in a framework of retaining members during the compression of the screen, whereby the formation of kinks in the supporting wires and screening wires is substantially avoided.

27. A process as claimed in claim 3 wherein the compression is effected while the wire screen is at an elevated temperature.

28. A process as claimed in claim 3 for the preparation of cylindrical wire screens which comprises compressing a cylindrical wire screen formed from a spiral of screening wire and a plurality of supporting wires disposed parallel to the longitudinal axis of the spiral of screening wire, the wire screen being compressed along the longitudinal axes of the supporting wires.

* * * * *

UNITED STATES PATENT AND TRADEMARK OFFICE
CERTIFICATE OF CORRECTION

PATENT NO. : 3,941,703
DATED : March 2, 1976
INVENTOR(S) : Edouard Binard

It is certified that error appears in the above-identified patent and that said Letters Patent are hereby corrected as shown below:

On the cover page at Section 30, "Foreign Application Priority Data" should read:

Dec. 11, 1973 United Kingdom 57430/73

Signed and Sealed this

*Twenty-first* Day of *March 1978*

[SEAL]

*Attest:*

RUTH C. MASON
*Attesting Officer*

LUTRELLE F. PARKER
*Acting Commissioner of Patents and Trademarks*